D. MARSHALL.
WHEEL HAVING SELF CONTAINED MOTOR.
APPLICATION FILED NOV. 7, 1917. RENEWED JUNE 21, 1920.
1,384,142.
Patented July 12, 1921.
2 SHEETS—SHEET 1.
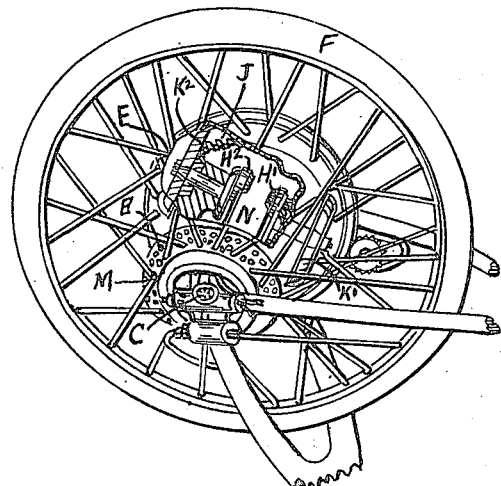
FIG. 1.
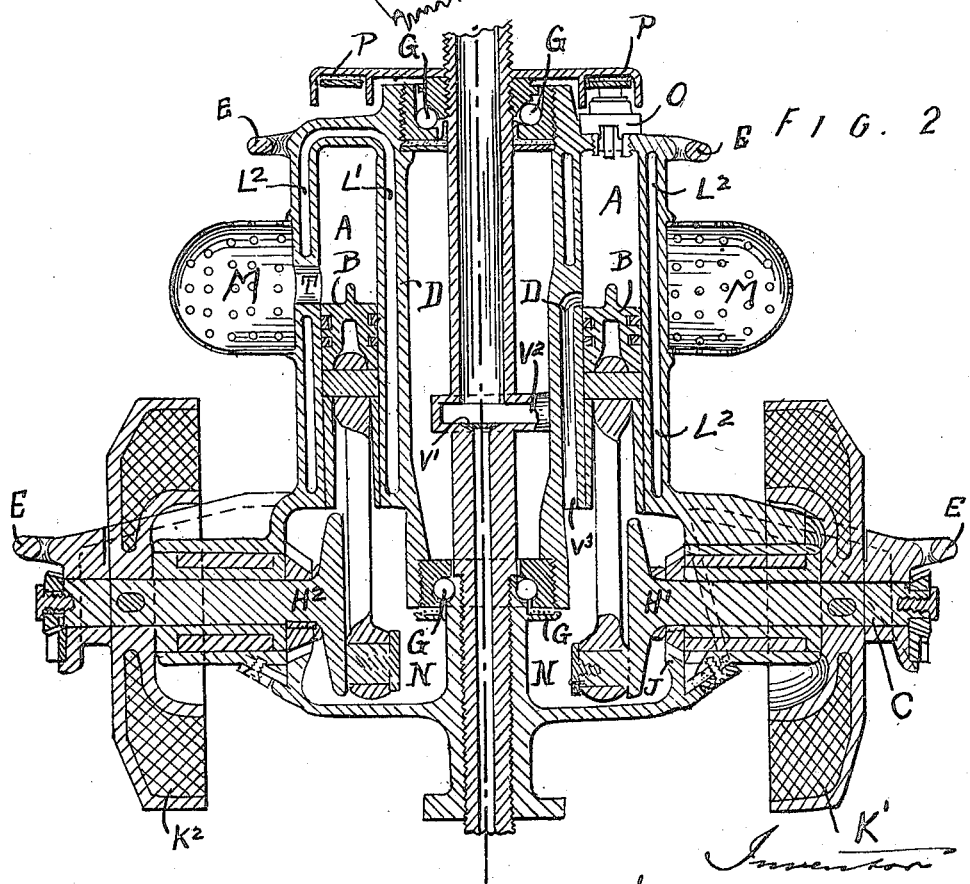

D. MARSHALL.
WHEEL HAVING SELF CONTAINED MOTOR.
APPLICATION FILED NOV. 7, 1917. RENEWED JUNE 21, 1920.

1,384,142.

Patented July 12, 1921.
2 SHEETS—SHEET 2.

Inventor

UNITED STATES PATENT OFFICE.

DALE MARSHALL, OF CHELTENHAM, ENGLAND.

WHEEL HAVING SELF-CONTAINED MOTOR.

1,384,142.                  Specification of Letters Patent.      Patented July 12, 1921.

Application filed November 7, 1917, Serial No. 200,852. Renewed June 21, 1920. Serial No. 390,669.

(GRANTED UNDER THE PROVISIONS OF THE ACT OF MARCH 3, 1921, 41 STAT. L., 1313.)

*To all whom it may concern:*

Be it known that I, DALE MARSHALL, subject of the King of Great Britain, residing at 30 Winchombe street, Cheltenham, Gloucestershire, England, have invented certain new and useful Improvements in Wheels Having Self-Contained Motors, of which the following is a specification.

My invention relates to motor driven traction wheels and particularly to a wheel of this character having a self-contained motor preferably of the internal combustion type.

The primary object of the invention is to provide an improved and practical system of propelling motor vehicles, motor cycles, and such carriages.

A further object of the invention is to provide a construction which may be made and sold on the market in the form of a wheel with a self-contained motor whereby it may be purchased independent of the vehicle to which it is adapted to be applied, and incorporated in an existing vehicle by substituting it for one or more of the existing traction wheels.

Further objects will be apparent upon reference to the accompanying drawing, in which—

Figure 1 is a perspective view of a wheel illustrating the invention as incorporated therewith;

Fig. 2 is a sectional view of the motor and its associated parts.

Figure 3:
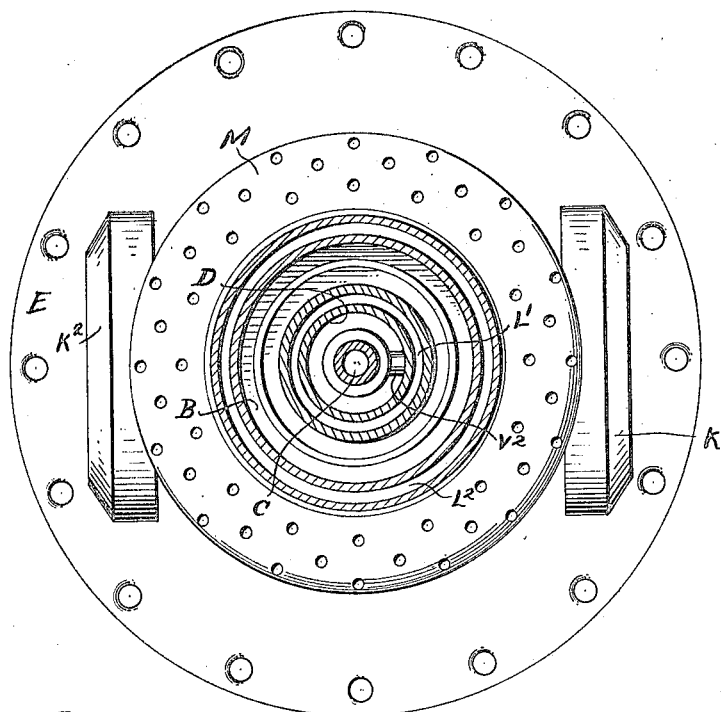
Fig. 3 is a cross-sectional view of the motor, taken immediately above the silencer M.

Referring to the drawings, in detail, A represents the collar-shaped cylinder and B represents the collar-shaped piston adapted to work in the cylinder A. The cylinder is mounted upon and adapted to rotate about the axle or shaft C. This cylinder also provides a hub D for the wheel and is constructed with flanges E to which is attached the spokes of the wheel which spokes carry the usual rim on which is mounted the tire F. The mounting for the cylinder on the shaft C comprises ball bearings G. The piston B works in the cylinder A longitudinally of the axle or shaft and is constructed to give axial rotation to the cylinder A which in turn imparts the necessary drive to the wheel, the cylinder being a part of the wheel by reason of the spokes being fixed to the flanges carried thereby. If desirable, the axle or shaft C may be connected to the crank shafts $H_1$ $H_2$ of the piston B and in this event the crank shaft will have a geared or like engagement with an annular member J mounted at the side of the wheel. When it is desirable to impart a rotative movement to the axle or shaft C instead of directly to the wheel, the hub or cylinders are secured against rotation. Fly-wheels $K_1$ $K_2$ are provided on the crank shafts $H_1$ $H_2$. Around the cylinder walls are provided water jackets $L_1$ $L_2$ which are employed for cooling purposes, or, if desired, the cylinder may be air-cooled in which event, usual radial flanges are provided. Outside of the jacket $L_2$ is provided an annular chamber M adapted to receive and serve as a muffling means for the exhaust; a suitable passage T connects the cylinder with the muffler. The carbureted fuel is taken into the working cylinder through the axle or shaft bearing and crank chamber N through the ports $V_1$ $V_2$ and $V_3$. For purposes of ignition electric current for causing the spark is connected to a suitable spark plug O mounted in the top of the working cylinder with its top so arranged that it will have a wiping contact with a live ring P.

Having thus described the nature of my invention, what I claim is:—

1. In wheels containing motors which use a piston within a cylinder as part of their construction, the combination of a wheel hub formed to serve as a power cylinder, of collar-shape with peripheral flanges and so constructed as to centrally accommodate the carrying shaft or axle about which it is intended to operate, and a piston of like shape within the said cylinder moving lengthwise to the carrying shaft connected so as to give rotary motion to one of the co-acting members.

2. In power units, as in claim 1, the said collar-shaped piston connected to transversely situated crank-shafts, an extension of the said wheel hub in which the crank shafts are rotatively carried, which crankshafts have geared connection with an annular member fixed to adjacent parts of the central shaft or axle and provide by their propulsive movements, rotary motion to one of the co-acting members.

3. In power units, as in claim 1, the combination of means for supplying the propulsive gases or fluid to the cylinder through its inner wall from hub and axle or shaft centers, an annular chamber at the hub's periphery for exhaust gases and cooling means upon the outer wall of cylinder.

4. In power units, as in claim 1, an annular fixed ring for continued contact with the ignition plug through which the electric current may flow.

In testimony whereof the foregoing specification is signed in the presence of two witnesses.

DALE MARSHALL.

Witnesses:
JAMES HENRY BABBAGE,
VIDA PAGET.